(12) United States Patent
Romanov et al.

(10) Patent No.: US 11,660,790 B2
(45) Date of Patent: May 30, 2023

(54) DEVICE AND METHOD FOR PRODUCING A PARTICLE FOAM PART

(71) Applicant: Kurtz GmbH, Kreuzwertheim (DE)

(72) Inventors: Victor Romanov, Wertheim (DE); Norbert Reuber, Bergrothenfels (DE)

(73) Assignee: Kurtz GmbH, Kreuzwertheim (DE)

( * ) Notice: Subject to any disclaimer, the term of this patent is extended or adjusted under 35 U.S.C. 154(b) by 55 days.

(21) Appl. No.: 16/769,005

(22) PCT Filed: Dec. 4, 2018

(86) PCT No.: PCT/EP2018/083465
§ 371 (c)(1),
(2) Date: Jun. 2, 2020

(87) PCT Pub. No.: WO2019/110579
PCT Pub. Date: Jun. 13, 2019

(65) Prior Publication Data
US 2021/0221035 A1    Jul. 22, 2021

(30) Foreign Application Priority Data

Dec. 5, 2017    (DE) .......................... 102017128895.3

(51) Int. Cl.
*B29C 44/34* (2006.01)
*B29C 35/08* (2006.01)
(Continued)

(52) U.S. Cl.
CPC ...... *B29C 44/3415* (2013.01); *B29C 35/0805* (2013.01); *B29C 44/445* (2013.01);
(Continued)

(58) Field of Classification Search
CPC . B29C 44/3415; B29C 35/0805; B29C 35/08; B29C 44/445; B29C 44/462; B29C 2035/0211
See application file for complete search history.

(56) References Cited

U.S. PATENT DOCUMENTS 3,060,513 A   10/1962 Klink et al.
3,242,238 A   3/1966 Edberg et al.
(Continued)

FOREIGN PATENT DOCUMENTS

CA    1011070         5/1977
CN    1835835 A       9/2006
(Continued)

OTHER PUBLICATIONS

International Preliminary Report on Patentability, dated Jun. 18, 2020, from International Application No. PCT/EP2018/083465, filed on Dec. 4, 2018. 8 pages.
(Continued)

*Primary Examiner* — Stella K Yi
(74) *Attorney, Agent, or Firm* — HoustonHogle LLP

(57) ABSTRACT

The invention relates to an apparatus and a method for the production of a particle foam part, wherein a mould cavity (5) is filled with foam particles, the foam particles are welded into a particle foam part and the particle foam part is cooled down in the mould. The foam particles are heated by means of a ceramic body (17) with integrated resistance heating and by the application of electromagnetic waves.

12 Claims, 3 Drawing Sheets

Figure 1:
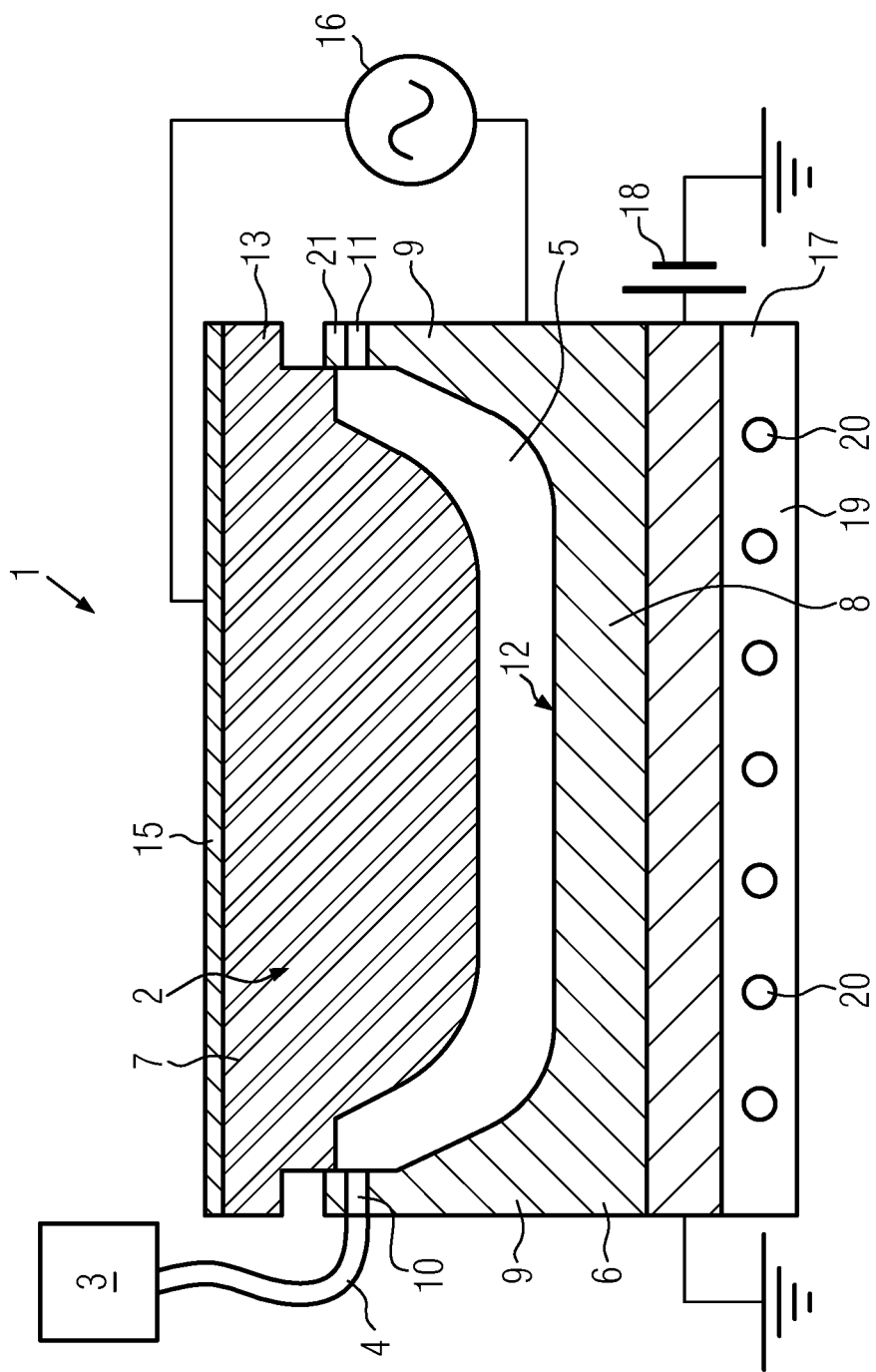

(51) Int. Cl.
*B29C 44/44* (2006.01)
*B29K 105/04* (2006.01)

(52) U.S. Cl.
CPC ............... *B29C 2035/0855* (2013.01); *B29C 2035/0861* (2013.01); *B29K 2105/04* (2013.01); *B29K 2909/02* (2013.01)

(56) References Cited

U.S. PATENT DOCUMENTS

| | | | |
|---|---|---|---|
| 4,035,216 | A | 7/1977 | Immel |
| 5,128,073 | A | 7/1992 | Allen et al. |
| 2007/0039943 | A1* | 2/2007 | Burr ............... B29C 45/73 219/461.1 |
| 2014/0243442 | A1* | 8/2014 | Coles ............... B29C 35/0805 521/143 |

FOREIGN PATENT DOCUMENTS

| | | |
|---|---|---|
| DE | 202004009742 U1 | 9/2004 |
| DE | 102007040283 A1 | 2/2009 |
| DE | 202016104341 U1 | 4/2017 |
| EP | 2181080 B1 | 5/2010 |
| EP | 2181180 B1 | 1/2016 |
| GB | 1403326 A | 8/1975 |
| WO | WO 0164414 A1 | 9/2001 |
| WO | WO 2013005081 A1 | 1/2013 |
| WO | WO 2014128214 A1 | 8/2014 |

OTHER PUBLICATIONS

International Search Report, dated Apr. 4, 2019, from International Application No. PCT/EP2018/083465, filed on Dec. 4, 2018. 16 pages.
Written Opinion, dated Apr. 4, 2019, from International Application No. PCT/EP2018/083465, filed on Dec. 4, 2018. 16 pages.
German Search Report, dated Mar. 8, 2018, from German Application No. 10 2017 128 895.3, filed on Dec. 5, 2017. 6 pages.
Second Chinese Office Action dated Mar. 9, 2022, from Chinese Application No. 201880076625.2, filed on Dec. 4, 2018. 20 pages.

\* cited by examiner

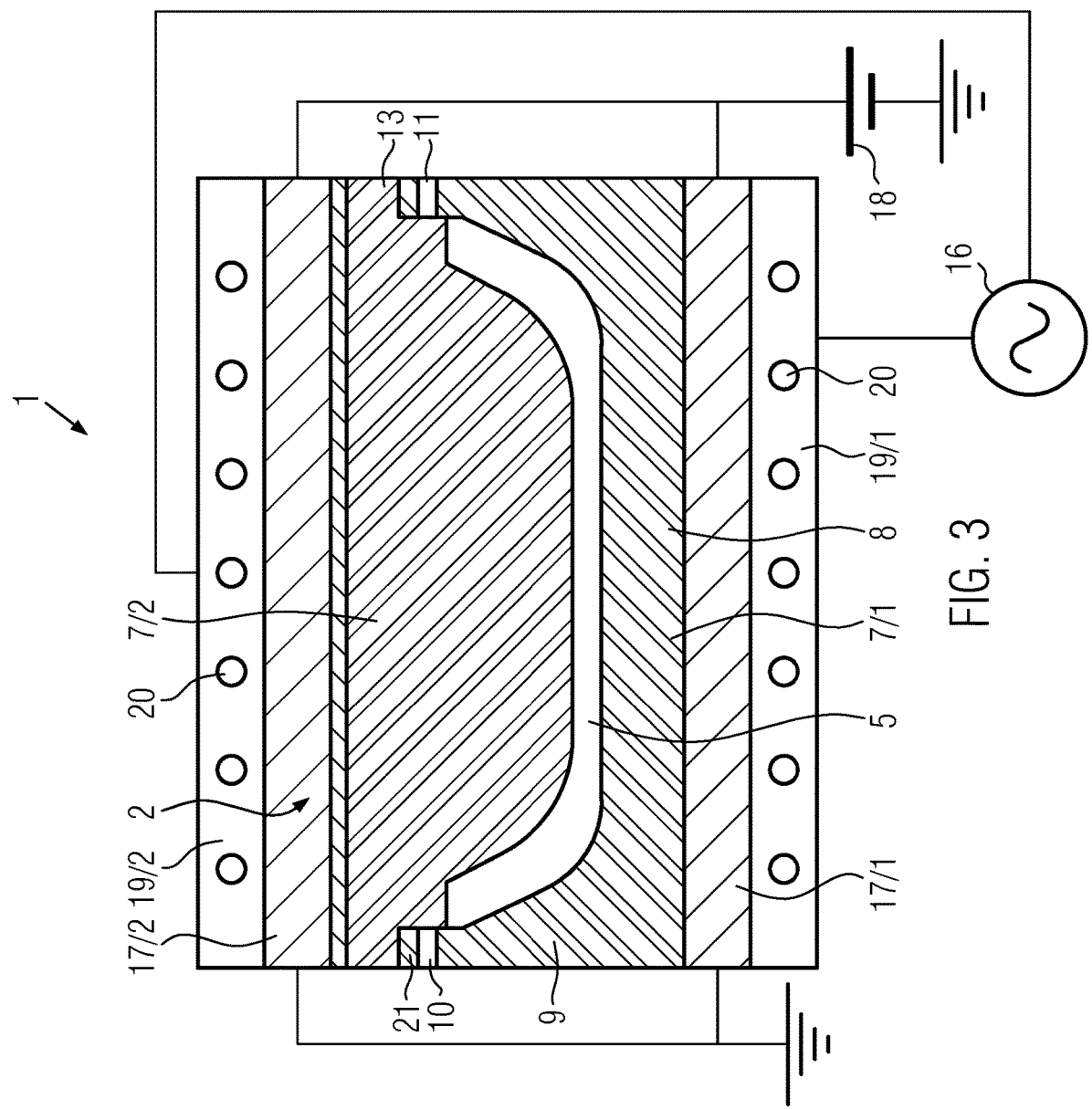

DEVICE AND METHOD FOR PRODUCING A PARTICLE FOAM PART

RELATED APPLICATIONS

This application is a § 371 National Phase Application of International Application No. PCT/EP2018/083465, filed on Dec. 4, 2018, now International Publication No. WO 2019/110579, published on Jun. 13, 2019, which International Application claims priority to German Application 10 2017 128 895.3, filed on Dec. 5, 2017, both of which are incorporated herein by reference in their entirety.

The present invention relates to an apparatus for producing a particle foam part.

WO 2014/128214 A1 discloses an apparatus and a method for producing a particle foam part. Here, foam particles are conveyed by means of a pipe from a material container to a mould, in which the foam particles are welded thermoplastically into a particle foam part under a supply of heat. In this case the heat is supplied by means of saturated dry steam.

In addition there are various tests and developments for supplying the heat by means of electromagnetic waves, in order to weld foam particles together. As examples, reference is made to WO 2013/05081 A1, U.S. Pat. Nos. 3,060,513, 3,242,238, GB 1,403,326, WO 01/64414 A1 and U.S. Pat. No. 5,128,073.

Also known, from WO 2014/128214 A1 is the use as mould of a so-called crack gap mould, which has a mould cavity of variable volume. In the case of such a crack gap mould, two mould halves which bound a mould cavity are arranged at a predetermined distance from one another. In this crack gap position, the mould is filled with foam particles. Then, the mould halves of the crack gap mould are pressed a little together, thereby compressing the foam particles in the mould. In this compressed state, the foam particles are welded together.

DE 20 2004 009 742 U1 discloses a heatable mould for an apparatus processing molten plastic or molten metal and which has as heating element an electrically conductive ceramic body.

Described in EP 2 181 080 B1 is a heating device for an injection moulding machine, with electrically conductive ceramic material which has a spiral wire structure. This spiral wire structure is created by making slits in the ceramic body, after which the surface of the whole ceramic body is etched by acid, so that electrically conductive cross-linking structures are dissolved in the area of the surface of the ceramic body. The ceramic body then consists of the spiral wire structure surrounded by electrically insulating ceramic material.

Also known from DE 20 2016 104 341 U1 is a mould made from ceramic which may have a heating element in the form of heating wires.

The invention is based on the problem of creating an apparatus and a method for the production of a particle foam part, with which large-volume or large-area particle foam parts of high quality and in particular high surface quality may be produced.

The problem is solved by an apparatus and a method according to the independent patent claims. Advantageous developments of the invention are set out in the relevant dependent claims.

An apparatus according to the invention for the production of a particle foam part comprises a mould for bounding a mould cavity for the holding of foam particles and a heating device for welding the foam particles into a particle foam part. The apparatus is characterised in that the heating device comprises a ceramic body with integrated resistance heating wires and also a generator to supply the mould cavity with electromagnetic waves.

Such a ceramic body with integrated resistance heating wires may be heated to very high temperatures, since ceramics may be heated to much higher temperatures than plastics. In addition, ceramics are very good heat conductors. Because of this, heat may be conducted very quickly away from the mould. This allows the production of particle foam parts with very steep temperature ramps, both during heating up and cooling down. The provision of a generator to supply the mould cavity with electromagnetic waves allows heating of the foam particles through absorption of the electromagnetic waves, so that the foam particles heat up relatively evenly in the mould. By this means, a relatively uniform welding of the foam particles is obtained. On the other hand, the surface of the particle foam part to be produced may at least in certain areas be heated additionally at the surface, through the additional supply of heat from the ceramic body, so that this surface is melted to form a smooth surface by means of the heat provided by the ceramic body. This is especially advantageous for large-volume, large-area particle foam parts, which may therefore be produced on the one hand with very uniform welding and on the other hand with a surface which is very smooth in certain areas.

The heating device, which includes both a ceramic body provided with an integrated resistance heating wire and also a generator to generate electromagnetic waves, also permits very rapid heating up and cooling down of the foam particles, so that a high throughput may be achieved with such an apparatus.

The integrated resistance heating wire is made from electrically conductive or semi-conductive Preferably a cooling body with channels through which a cooling medium may be fed is connected to the ceramic body. The cooling medium is for example water. The ceramic body may be in the form of a metal body. The cooling body may however also be an additional ceramic body or a section of the ceramic body in which the channels are formed.

The mould has preferably two mould halves, wherein the ceramic body is connected to one mould half or the ceramic body forms the one mould half.

The mould halves may in principle be made of any desired material. The mould half to which the ceramic body is connected is preferably made of a material which is a good conductor of heat, for example metal or ceramic material. The use of metal has the advantage that the surface of the mould half which bounds the mould cavity may be made very smooth by conventional production processes, such as milling, so that particle foam parts with very high surface quality can be produced. In addition, a mould half of metal, which is electrically conductive, may be used as capacitor plate to supply the mould cavity with electromagnetic waves. If the mould half is made of a non-electrically conductive material, then a separate capacitor plate should be provided to supply the mould cavity with electromagnetic waves.

Also, in principle, both mould halves of the mould could each be provided with a ceramic body with integrated heating wiring. This allows rapid heating up of the foam particles on the whole peripheral surface of the mould cavity.

Preferably however the mould half not connected to the ceramic body is made of a plastic body and has a separate capacitor plate. The plastic body may be of materials with differing permittivity (dielectric constant) and/or varying thickness and/or provided with electrically conductive bodies and/or the capacitor plate may be contoured so as to form the electrical field of the electromagnetic waves. Through skillful choice of the plastic material with differing permittivity or through integration of metal parts, the electrical fields may be so formed that either there is a uniform field strength in the whole of the mould cavity, or else certain points are provided with a higher field strength. Higher field strength is especially useful in corner zones of the mould cavity at which edges of the particle foam part are formed, so as to effect here a stronger melting of the foam particles. This results in good distinct edges on the particle foam part. In principle it would be conceivable to make both mould halves of metal and to use both as capacitor plates. However, in the case of a particle foam part with a non-smooth surface, varying field strengths would be generated in the mould cavity in such a way that uniform welding of the particle foam part would be considerably impaired. The combination of an electrically conductive mould half and a non-electrically conductive mould half is therefore preferred, since by this means the energy of the electromagnetic waves may be brought into the mould cavity with minimal losses, since the one mould half directly bounds the mould cavity and, on the other hand, the non-electrically conductive mould half forms the electrical field in such a way that particle foam parts of high quality may be produced reliably.

Preferably the electrically conductive ceramic material has metal-like carbides (ZrC, TiC) or nitrides ((TiN, TaN) or silicon carbide, boron carbide or titanium sub-oxide. These ceramics are electrically conductive or semi-conductive. These electrically conductive or semi-conductive ceramic materials may be embedded in essentially insulating materials, such as e.g. silicon nitride ($Si_3N_4$), or various electrically conductive or semi-conductive ceramic components may be bonded into a ceramic composite material, as for example silicon carbide (SiC) and boron carbide ($B_4C$).

The electrical resistance heating wiring in the ceramic body may be produced as described in EP 2 181 180 B1. In this respect, reference is made to EP 2 181 180 B1. The resistance heating wiring may however also be made by the sintering of conductive and non-conductive structures.

The mould is preferably a crack gap mould. With such a crack gap mould, the two mould halves may be brought into a crack gap position, in which foam particles may be fed in. The mould halves are then moved a short distance together, so that the foam particles contained therein are compressed. In such an end position of the mould, the foam particles are then welded by heating.

According to a further aspect of the present invention, a method for the production of a particle foam part is provided in which:
 a mould cavity is filled with foam particles
 the foam particles are welded into a particle foam part
 the particle foam part is cooled down and
 the mould is demoulded.

This method is characterised in that the foam particles are heated by means of a ceramic body with integrated resistance heating wiring and by the application of electromagnetic waves.

Preferably the heating by means of the ceramic body and the application of electromagnetic waves take place simultaneously.

The foam particles may be heated to a temperature of at least 150° C. and in particular of at least 190° C. and preferably of at least 200° C. By this means it is possible to produce particle foam parts from plastic materials which cannot be welded by conventional methods in which the foam particles are welded by steam. This makes it possible to produce particle foam parts which are stable under corresponding temperatures of for example 150° C., 190° C. or 200° C. Because of this, such particle foam parts may undergo further processing stages, for example painting, in which correspondingly high temperatures occur.

With this method, foam particles of polyethylene-block-amide (PEBA), polyethylene (PE), polyurethane (PU) or polyethylene-terephthalate (PET) may be welded into particle foam part. These materials absorb electromagnetic waves, so that they may be heated directly by the electromagnetic waves.

With this method, foam particles based on ePP (expandable polypropylene, PP) or ePS (expandable polystyrol) may also be welded to form particle foam parts, involving their mixing with or wetting by a heat transfer medium, as for example water. The heat transfer medium absorbs the electromagnetic waves and transfers the heat to the foam particles.

In the case of materials such as for example ePES (expandable polyether sulphone) or expandable polyamide, the dielectric loss factor and therefore the ability to absorb electromagnetic waves is dependent on temperature. Such materials may be initially preheated with a heat transfer medium until they absorb electromagnetic waves adequately. Through the provision of the additional heating by the ceramic body, the foam particles may however first be preheated electrically to a specific temperature, until they are hot enough to absorb electromagnetic waves adequately.

The electromagnetic waves are preferably electromagnetic RF radiation. This electromagnetic RF radiation preferably has a frequency of at least 30 KHz or at least 0.1 MHz, in particular at least 1 MHz or at least 2 MHz and preferably at least 10 MHz.

The electromagnetic RF radiation has preferably a maximum frequency of 300 MHz.

The generator for the generation of electromagnetic waves generates preferably electromagnetic waves with an amplitude of at least $10^3$V and in particular at least $10^4$V. Commonly available generators generate RF radiation at a frequency of 27.12 MHz.

The electromagnetic waves may also be microwaves.

For this method, preferably an apparatus such as described above is used.

Figure 2:
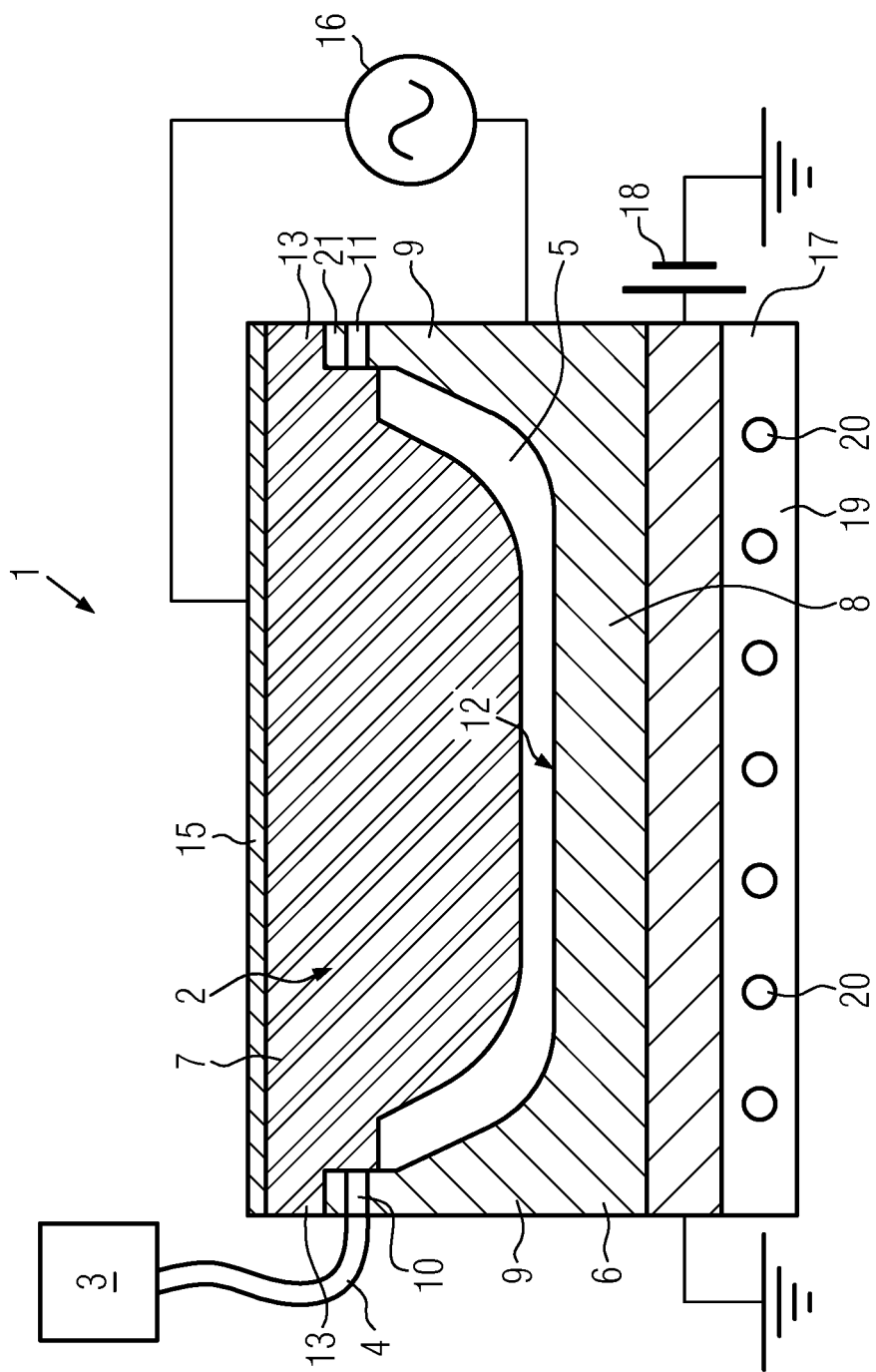

The invention will be explained in detail by way of example with the aid of the drawings, which show in:

FIG. 1 a schematic view of an apparatus for the production of a particle foam part, in which a mould of this apparatus is arranged in a crack gap position FIG. 2 the apparatus of FIG. 1, with the mould arranged in an end position, and FIG. 3 a schematic view of an apparatus for the production of a particle foam part, in which a mould is provided with two mould halves, each made of plastic.

An apparatus 1 for the production of a particle foam part comprises a mould 2, a material container 3 and a pipe 4 leading from the material container 3 to the mould 2. Through the pipe 4, foam particles may be fed to the mould 2 and are introduced into a mould cavity 5 bounded by the mould 2 (FIGS. 1, 2).

The mould 2 is made of two mould halves 6, 7, designated below as the quality mould half 6 and the functional mould half 7. In FIGS. 1 and 2, the quality mould half 6 is arranged below the functional mould half 7. The arrangement of the mould halves may however also be switched or rotated as desired (for example rotated through 90°).

The functional mould half 7 is made of a metal body with a base 8 and a continuous side wall 9. Formed in the side wall 9 are through holes 10, 11, which serve to feed the foam particles into the mould cavity 5 or to vent the mould cavity 5. One through hole 10 is connected to the pipe 4 leading from the material container 3.

The base 8 and the side wall 9 bound a hollow space and the mould cavity 5 respectively. The surface of the latter is in the form of the quality surface 12. In the present embodiment, the quality surface 12 is milled and has a very smooth surface.

The functional mould half 7 is a plastic body made of a plastic which is substantially transparent to electromagnetic waves, such as e.g. polytetra-fluoroethylene (PTFE), polyethylene, in particular UHMWPE, polyether-ketone (PEEK) and other materials transparent to RF radiation. The plastic body may be a monolithic plastic body. It may however also be made of several plastics, in particular of several plastic layers. In particular it is expedient to make the surface of the functional mould half 7 which faces the quality mould half 6 out of a plastic layer which absorbs electromagnetic waves and by this means is heated.

The functional mould half 7 forms a punch, which is able to dip a short distance into the hollow space bounded by the quality mould half 6 and closes flush with the upper and free edge 21 of the continuous side wall 9 of the quality mould half 6. A gap formed between the free edge of the continuous 9 and the opposite surface of the functional mould half 7 facing this edge is smaller than the smallest foam particles usually fed to the mould cavity 5, so as to ensure that no foam particles can escape from the mould cavity 5.

Formed at the side of the functional mould half 7 facing away from the quality mould half 6 is a continuous collar 13 which, with full insertion of the functional mould half 7, lies on top of the quality mould half 6 at the upper edge of the side wall 9 of the quality mould half 6 (FIG. 2).

In the area of the collar 13, a continuous metal ring 14 is integrated in the functional mould half 7. In the present embodiment, the metal ring 14 is continuous. It may however extend over one or more circumferential segments or be omitted altogether.

Located on the side of the functional mould half 7 facing away from the quality mould half 6 is a capacitor plate 15. In the present embodiment, the capacitor plate 15 is permanently connected to the functional mould half 7.

The capacitor plate 15 and the quality mould half 6 are each connected to a generator 16 for the generation of electromagnetic waves. The generator 16 is designed to generate RF radiation at a frequency of 27.12 MHz.

The metal ring 14 shortens the distance between the electrically conductive quality mould half 6 and the capacitor plate 15, thereby leading to a compression of the electrical field. By this means, greater energy density is created in the edge area of the mould cavity 5, leading to correspondingly more powerful melting of the foam particles. This results in good edge formation on the finished particle foam part.

Connected to the side of the quality mould half 6 facing away from the functional mould half 7 is a ceramic body 17 with integrated resistance heating wiring. The resistance heating wiring is connected to a power source 18 so that the ceramic body may be heated electrically and can form resistance heating wiring.

Provided on the side of the ceramic body 17 facing away from the quality mould half 6 is a cooling body 19 which has several cooling channels 20, through which may flow a cooling medium such as for example water.

The operation of the apparatus 1 in producing a particle foam part is explained below.

The mould 2 is firstly arranged with its two mould halves 6, 7 in a crack gap position (FIG. 1), in which the functional mould half 7 closes flush with the free edge 21 of the quality mould half 6, but the two mould halves 6, 7 are far enough apart from one another that the through holes 10, 11 open out freely in the mould cavity 5.

Foam particles are fed from the material container 3 through the pipe 4 to the mould cavity 5.

When the mould cavity 5 is completely filled with foam particles, then the two mould halves 6, 7 are pressed together into the end position (FIG. 2). For this purpose a press (not illustrated) is used. The two mould halves 6, 7 are held in the end position by the press. In the end position the two through holes 10, 11 are covered by the functional mould half and therefore closed.

By means of the generator 16, RF radiation is then applied to the mould cavity 5 and at the same time, by means of the power source 18, the ceramic body 17 and with it the quality mould half 6 are heated. Since the ceramic body 17 and the quality mould half 6 made of metal are each good heat conductors, the foam particles in contact with the quality mould half 6 are heated with similar rapidity, like the foam particles in the interior of the mould cavity 5, which are heated especially by the electromagnetic radiation. Very even heating is therefore obtained at the interface with the quality mould half 6 and in the interior of the mould cavity 5. This results in a very homogenous welding of the foam particles and a particle foam part of high quality.

It is also possible for the quality mould half 6 to be heated for a short time to a temperature which lies above the temperature of the foam particles in the rest of the mould cavity 5. This leads to melting of the foam particles and of the particle foam part respectively at the surface in contact with the quality mould half 6.

After the heating process, the mould 2 is cooled down. For this purpose the electromagnetic radiation produced by the generator 16 and the heating current generated by the power source 18 are switched off, and cooling medium is fed through the cooling channels 20 of the cooling body 19. By this means, the quality mould half 6 in particular is cooled down very rapidly, since the metal quality mould half 6 and the ceramic body 17 are good heat conductors, so that heat can be conducted away quickly through the cooling body 19. If during the heating phase, the surface of the particle foam part adjacent to the quality mould half 6 was melted, then it solidifies quickly and takes exactly the shape of the surface of the quality mould half 6. In this way a particle foam part is produced which has a high quality surface and is made exactly complementary to the surface of the quality mould half 6.

In principle, due to the layered structure of the quality mould half 6, the ceramic body 17 and the cooling body 19, heat may be conducted away from the mould cavity 5 very quickly, making it possible to produce large-area and large-volume particle foam parts efficiently. In addition, a temperature profile may be implemented very precisely in the particle foam part, making it possible to produce particle foam parts from plastic materials with very specific temperature requirements.

Moreover, in such an apparatus, the foam particles may be heated to high temperatures of for example above 150° C., above 190° C., above 200° C. and in particular above 250° C. Because of this it is possible to use plastic materials which melt only at high temperatures and are correspondingly thermally-stable. The particle foam parts made from these materials have correspondingly high thermal stability and may undergo further processing steps in which they are subjected to high temperatures which foam particles of polystyrol or polypropylene could not withstand.

After cooling down of the mould, the two mould halves 6, 7 are moved apart from one another and the finished particle foam part is removed.

A second embodiment of an apparatus 1 for the production of a particle foam part will be explained below. Identical parts are given the same reference number as in the first embodiment. Unless otherwise stated below, the statements made for the first embodiment apply equally for the same parts of the second embodiment.

The apparatus 1 for the production of a particle foam part again includes a mould 2, a material container 3 (not shown) and a pipe (not shown) leading from the material container to the mould 2. The mould 2 has two mould halves 7/1 and 7/2, each made of plastic. They may each be in the form of a monolithic plastic body. Preferably though, they are made of different plastic bodies. For example the surface bordering a mould cavity 5 may be made of a plastic material which absorbs electromagnetic waves, and the remaining area of the mould halves 7/1, 7/2 of a material which does not absorb electromagnetic waves. By this means, the mould halves 7/1, 7/2 are heated at their edge areas adjoining the mould cavity 5 when electromagnetic waves are applied.

In this embodiment, a ceramic body 17/1, 17/2 is connected to each of the two mould halves 7/1, 7/2. The ceramic bodies 17/1, 17/2 are designed just like the ceramic body 17 of the first embodiment and are connected to a power source 18. By applying a suitable current, the ceramic body 17/1, 17/2 may be heated by means of resistance heating. In the present embodiment a common power source 18 is provided for both ceramic bodies 17/1, 17/2. It is however also possible to provide two independent power sources, so that the two ceramic bodies 17/1, 17/2 may be heated independently of one another.

At the side of the ceramic bodies 17/1, 17/2 facing away from the mould halves there is in each case a cooling body 19/1, 19/2 with cooling channels 20. The cooling bodies are designed exactly as in the first embodiment and are made of an electrically conductive material, such as e.g. aluminium or copper or a corresponding metal alloy. The cooling bodies 19/1, 19/2 are connected to a generator 16. The generator 16 is designed to generate RF radiation at a frequency of 27.12 MHz. The cooling bodies 19/1, 19/2 thus act as capacitor plates, in order to apply an electromagnetic field to the mould cavity 5.

The second embodiment may be used in the same manner as the first embodiment.

In the present second embodiment, the cooling bodies 19/1, 19/2 are located outside the ceramic bodies 17/1, 17/2 with reference to the mould cavity 5. In the context of the invention it is possible for the arrangement of the cooling bodies and the ceramic bodies to be exchanged, so that the cooling body is closer to the mould cavity 5 than the respective ceramic body. If the ceramic body is arranged closer to the mould cavity, then heating of the foam particles may be effected more quickly than if the ceramic body is located outside the cooling body. If the cooling body is arranged closer to the mould cavity 5 than the ceramic body, then the cooling down of the mould may be effected more rapidly than if the cooling body is located outside the ceramic body. Depending on whether it is more important for the heating of the foam particles in the mould cavity 5 to take place more quickly or for the cooling to be effected more quickly, the ceramic body or the cooling body is to be arranged closer to the mould cavity 5.

In principle it applies that the representation of FIGS. 1 to 3 is not true to scale. If the mould halves are made of plastic, then it is advantageous for them to be as thin-walled as possible, so that the heat conduction path between the mould cavity 5 and the ceramic body is as short as possible.

Each of the ceramic bodes of the present embodiment has integrated resistance heating wiring. The ceramic bodies are insulating in their peripheral area, so that the resistance heating wiring is electrically insulated from the adjacent cooling body. If the whole of the ceramic body is electrically conductive, then it may also be expedient to provide a separate insulating layer between the cooling body and the ceramic body.

In a further alternative embodiment, the ceramic body or bodies may also form the relevant mould halves. The ceramic bodies then have a complementary shape on one side, corresponding to the particle foam part to be produced.

The cooling bodies 19/1, 19/2 which are connected to the generator 16, may be cooled by water which, as cooling medium, is fed through the cooling channels 20. It may however also be expedient to use cooling media based on oil, which is electrically insulating to avoid discharging electrical charges in an undesired manner.

LIST OF REFERENCE NUMBERS 1 apparatus
2 mould
3 material container
4 pipe
5 mould cavity
6 mould half (quality-)
7 mould half (functional-)
8 base
9 side wall
10 through hole
11 through hole
12 quality surface
13 collar
14 metal ring
15 capacitor plate
16 generator
17 ceramic body
18 power source
19 cooling body
20 cooling channel
21 free edge

The invention claimed is:

1. Apparatus for producing a particle foam part comprising:
   a mould for bounding a mould cavity for holding foam particles;
   a heating device for welding the foam particles into a particle foam part, the heating device including:
   a ceramic body with an integrated resistance heating wire made from electrically conductive ceramic components or semi-conductive ceramic components for heating the mould; and
   a generator to supply the mould cavity with electromagnetic waves.

2. The apparatus according to claim 1, wherein a cooling body with channels through which a cooling medium may be fed is connected to the ceramic body.

3. The apparatus according to claim 1, wherein the mould has two mould halves, wherein the ceramic body is connected to a first mould half or the ceramic body forms the one mould half.

4. The apparatus according to claim 3, wherein a second mould half is made of a plastic body and has a capacitor plate adjacent to the second mould half, wherein the plastic body may be of materials with differing permittivity and/or varying thickness and/or provided with electrically conductive bodies and/or the capacitor plate may be contoured so as to form an electrical field of the electromagnetic waves.

5. The apparatus according to claim 3, wherein the first mould half to which the ceramic body is connected is made of metal.

6. The apparatus according to claim 1, wherein the mould has two mould halves, wherein both mould halves are connected to one such ceramic body, or two ceramic bodies each form one of the mould halves.

7. The apparatus according to claim 1, wherein two cooling bodies of an electrically conductive material are provided, and are connected to the generator to apply electromagnetic waves to the mould cavity.

8. The apparatus according to claim 1, wherein the conductive or semi-conductive ceramic components have metal-like carbides (ZrC, TiC) or nitrides ((TiN, TaN) or silicon carbide, boron carbide or titanium sub-oxide.

9. The apparatus according to claim 1, wherein the mould is a crack gap mould.

10. The apparatus according to claim 1, wherein a mould half is a plastic body made of a plastic which is substantially transparent to electromagnetic waves.

11. The apparatus according to claim 1, wherein the ceramic body is substantially transparent to electromagnetic waves.

12. The apparatus according to claim 1, wherein a mould half of the mould is a plastic body made of a plastic which is substantially transparent to the electromagnetic waves.

* * * * *